United States Patent
Gowda et al.

(10) Patent No.: US 11,170,111 B1
(45) Date of Patent: Nov. 9, 2021

(54) SYSTEM AND METHOD FOR PUBLISHING AND CONFIGURING A MANAGEMENT SERVICE INTERFACE

(71) Applicant: DELL PRODUCTS, LP, Round Rock, TX (US)

(72) Inventors: Srinivas Giri Raju Gowda, Santa Clara, CA (US); Syama Sundar Poluri, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/901,462

(22) Filed: Jun. 15, 2020

(51) Int. Cl.
*G06F 9/44* (2018.01)
*G06F 21/57* (2013.01)
*G06F 21/44* (2013.01)
*G06F 9/4401* (2018.01)

(52) U.S. Cl.
CPC .......... *G06F 21/575* (2013.01); *G06F 9/4403* (2013.01); *G06F 21/44* (2013.01); *G06F 2221/034* (2013.01)

(58) Field of Classification Search
CPC ...... G06F 21/575; G06F 9/4403; G06F 21/44; G06F 2221/034
See application file for complete search history.

(56) References Cited

U.S. PATENT DOCUMENTS

| 10,489,142 B1* | 11/2019 | Podgorsky | G06F 8/65 |
| 10,491,465 B2* | 11/2019 | Naga | H04L 67/34 |
| 2004/0268140 A1* | 12/2004 | Zimmer | G06F 21/575 726/3 |
| 2016/0057106 A1* | 2/2016 | Rabeela | H04L 61/6077 709/224 |
| 2016/0202744 A1* | 7/2016 | Castro-Leon | G06F 1/3287 713/310 |
| 2017/0237560 A1* | 8/2017 | Mueller | H04L 9/3263 713/168 |
| 2020/0019708 A1* | 1/2020 | Puthillathe | G06F 21/44 |
| 2020/0034541 A1* | 1/2020 | Ballard | G06F 8/65 |
| 2020/0310823 A1* | 10/2020 | Poosapalli | G06F 9/4411 |
| 2020/0379843 A1* | 12/2020 | Chao | G06F 11/1016 |

* cited by examiner

*Primary Examiner* — Zahid Choudhury
(74) *Attorney, Agent, or Firm* — Larson Newman, LLP

(57) ABSTRACT

An information handling system may include a management controller configured to direct a basic input/output system to generate an advanced configuration power interface (ACPI) event that is triggered by an update of a host interface attribute. A processor provides at least one function to publish and configure a host interface, where the host interface is associated with a management service. The processor may also detect the ACPI event triggered by the update of the host interface attribute. Subsequent to the detection of the ACPI event, a structure of the host interface associated with the management service and a supported authentication type and security information associated with the supported authentication type may be determined. The processor may authenticate to the host interface via the supported authentication type using the security information and update an operating system variable associated with the update of the host interface attribute.

20 Claims, 3 Drawing Sheets

SYSTEM AND METHOD FOR PUBLISHING AND CONFIGURING A MANAGEMENT SERVICE INTERFACE

FIELD OF THE DISCLOSURE

The present disclosure generally relates to information handling systems, and more particularly relates to publishing and configuring a management service interface.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system may include a management controller configured to direct a basic input/output system to generate an advanced configuration power interface (ACPI) event that is triggered by an update of a host interface attribute. A processor provides at least one function to publish and configure a host interface, where the host interface is associated with a management service. Subsequent to the detection of the ACPI event by the processor, a structure of the host interface associated with the management service and a supported authentication type and security information associated with the supported authentication type may be determined. The processor may authenticate to the host interface via the supported authentication type using the security information and update an operating system variable associated with the update of the host interface attribute.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
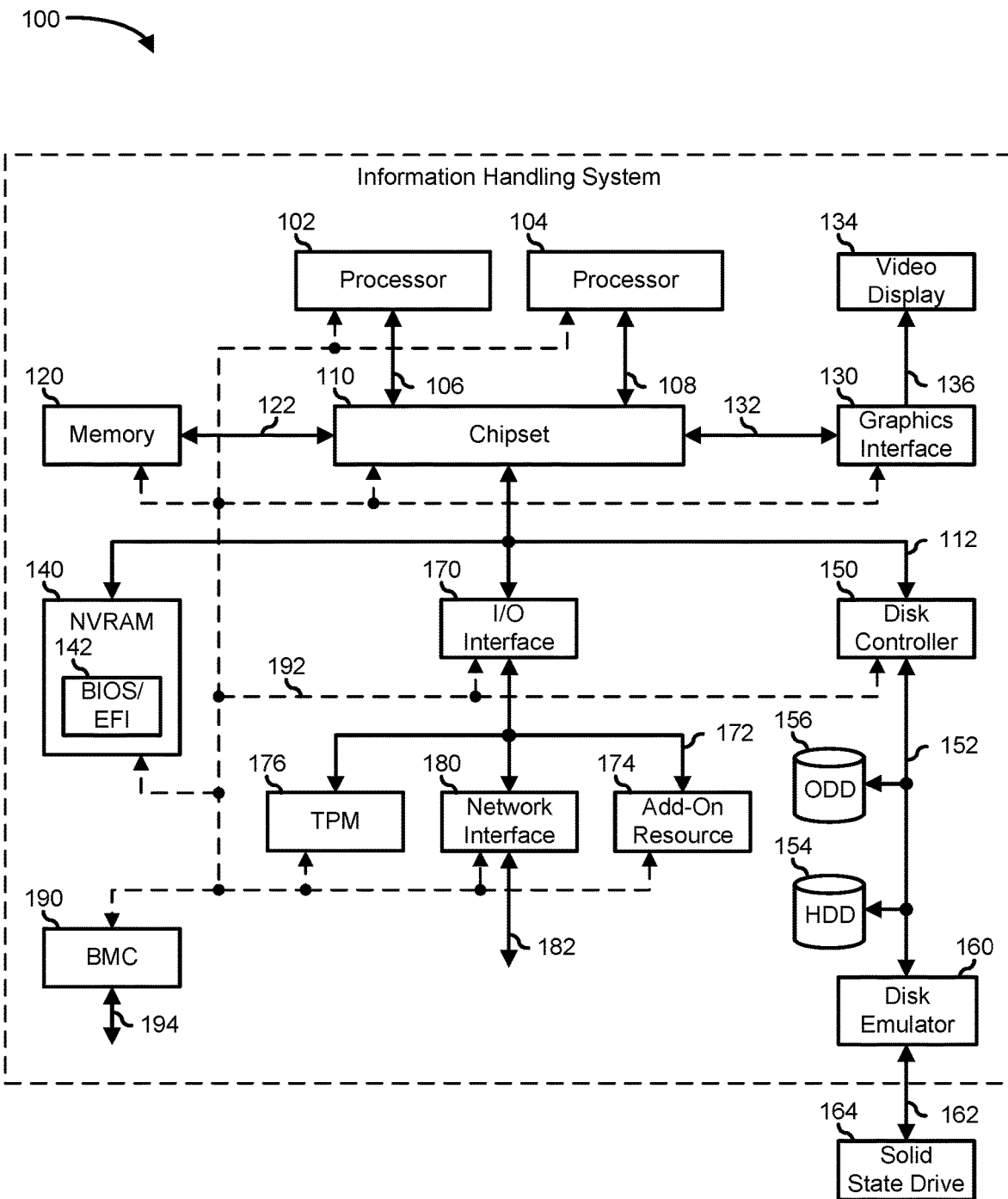
FIG. 1 is a block diagram illustrating an information handling system according to an embodiment of the present disclosure.

FIG. 1 illustrates an embodiment of an information handling system 100 including processors 102 and 104, a chipset 110, a memory 120, a graphics adapter 130 connected to a video display 134, a non-volatile RAM (NV-RAM) 140 that includes a basic input and output system/extensible firmware interface (BIOS/EFI) module 142, a disk controller 150, a hard disk drive (HDD) 154, an optical disk drive 156, a disk emulator 160 connected to a solid-state drive (SSD) 164, an input/output (I/O) interface 170 connected to an add-on resource 174 and a trusted platform module (TPM) 176, a network interface 180, and a baseboard management controller (BMC) 190. Processor 102 is connected to chipset 110 via processor interface 106, and processor 104 is connected to the chipset via processor interface 108. In a particular embodiment, processors 102 and 104 are connected together via a high-capacity coherent fabric, such as a HyperTransport link, a QuickPath Interconnect, or the like. Chipset 110 represents an integrated circuit or group of integrated circuits that manage the data flow between processors 102 and 104 and the other elements of information handling system 100. In a particular embodiment, chipset 110 represents a pair of integrated circuits, such as a northbridge component and a southbridge component. In another embodiment, some or all of the functions and features of chipset 110 are integrated with one or more of processors 102 and 104.

Memory 120 is connected to chipset 110 via a memory interface 122. An example of memory interface 122 includes a Double Data Rate (DDR) memory channel and memory 120 represents one or more DDR Dual In-Line Memory Modules (DIMMs). In a particular embodiment, memory interface 122 represents two or more DDR channels. In another embodiment, one or more of processors 102 and 104 include a memory interface that provides a dedicated memory for the processors. A DDR channel and the connected DDR DIMMs can be in accordance with a particular DDR standard, such as a DDR3 standard, a DDR4 standard, a DDR5 standard, or the like.

Memory 120 may further represent various combinations of memory types, such as Dynamic Random-Access Memory (DRAM) DIMMs, Static Random-Access Memory (SRAM) DIMMs, non-volatile DIMMs (NV-DIMMs), storage class memory devices, Read-Only Memory (ROM) devices, or the like. Graphics adapter 130 is connected to chipset 110 via a graphics interface 132 and provides a video display output 136 to a video display 134. An example of a graphics interface 132 includes a Peripheral Component Interconnect-Express (PCIe) interface and graphics adapter 130 can include a four-lane (x4) PCIe adapter, an eight-lane (x8) PCIe adapter, a 16-lane (x16) PCIe adapter, or another configuration, as needed or desired. In a particular embodiment, graphics adapter 130 is provided down on a system printed circuit board (PCB). Video display output 136 can include a Digital Video Interface (DVI), a High-Definition Multimedia Interface (HDMI), a DisplayPort interface, or the like, and video display 134 can include a monitor, a smart television, an embedded display such as a laptop computer display, or the like.

NV-RAM 140, disk controller 150, and I/O interface 170 are connected to chipset 110 via an I/O channel 112. An example of I/O channel 112 includes one or more point-to-point PCIe links between chipset 110 and each of NV-RAM 140, disk controller 150, and I/O interface 170. Chipset 110 can also include one or more other I/O interfaces, including an Industry Standard Architecture (ISA) interface, a Small Computer Serial Interface (SCSI) interface, an Inter-Integrated Circuit (I²C) interface, a System Packet Interface (SPI), a Universal Serial Bus (USB), another interface, or a combination thereof. NV-RAM 140 includes BIOS/EFI module 142 that stores machine-executable code (BIOS/EFI code) that operates to detect the resources of information handling system 100, to provide drivers for the resources, to initialize the resources, and to provide common access mechanisms for the resources. The functions and features of BIOS/EFI module 142 will be further described below.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits SSD 164 to be connected to information handling system 100 via an external interface 162. An example of external interface 162 includes a USB interface, an institute of electrical and electronics engineers (IEEE) 1394 (Firewire) interface, a proprietary interface, or a combination thereof. Alternatively, SSD 164 can be disposed within information handling system 100.

I/O interface 170 includes a peripheral interface 172 that connects the I/O interface to add-on resource 174, to TPM 176, and to network interface 180. Peripheral interface 172 can be the same type of interface as I/O channel 112 or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral interface 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a network communication device disposed within information handling system 100, on a main circuit board of the information handling system, integrated onto another component such as chipset 110, in another suitable location, or a combination thereof. Network interface 180 includes a network channel 182 that provides an interface to devices that are external to information handling system 100. In a particular embodiment, network channel 182 is of a different type than peripheral interface 172, and network interface 180 translates information from a format suitable to the peripheral channel to a format suitable to external devices.

In a particular embodiment, network interface 180 includes a NIC or host bus adapter (HBA), and an example of network channel 182 includes an InfiniBand channel, a Fibre Channel, a Gigabit Ethernet channel, a proprietary channel architecture, or a combination thereof. In another embodiment, network interface 180 includes a wireless communication interface, and network channel 182 includes a Wi-Fi channel, a near-field communication (NFC) channel, a Bluetooth or Bluetooth-Low-Energy (BLE) channel, a cellular based interface such as a Global System for Mobile (GSM) interface, a Code-Division Multiple Access (CDMA) interface, a Universal Mobile Telecommunications System (UMTS) interface, a Long-Term Evolution (LTE) interface, or another cellular based interface, or a combination thereof. Network channel 182 can be connected to an external network resource (not illustrated). The network resource can include another information handling system, a data storage system, another network, a grid management system, another suitable resource, or a combination thereof.

BMC 190 is connected to multiple elements of information handling system 100 via one or more management interface 192 to provide out of band monitoring, maintenance, and control of the elements of the information handling system. As such, BMC 190 represents a processing device different from processor 102 and processor 104, which provides various management functions for information handling system 100. For example, BMC 190 may be responsible for power management, cooling management, and the like. The term BMC is often used in the context of server systems, while in a consumer-level device a BMC may be referred to as an embedded controller (EC). A BMC included at a data storage system can be referred to as a storage enclosure processor. A BMC included at a chassis of a blade server can be referred to as a chassis management controller and embedded controllers included at the blades of the blade server can be referred to as blade management controllers. Capabilities and functions provided by BMC 190 can vary considerably based on the type of information handling system. BMC 190 can operate in accordance with an Intelligent Platform Management Interface (IPMI). Examples of BMC 190 include an Integrated Dell® Remote Access Controller (iDRAC).

Management interface 192 represents one or more out-of-band communication interfaces between BMC 190 and the elements of information handling system 100, and can include an Inter-Integrated Circuit (I2C) bus, a System Management Bus (SMBUS), a Power Management Bus (PMBUS), a Low Pin Count (LPC) interface, a serial bus such as a Universal Serial Bus (USB) or a Serial Peripheral Interface (SPI), a network interface such as an Ethernet interface, a high-speed serial data link such as a Peripheral Component Interconnect-Express (PCIe) interface, a Network Controller Sideband Interface (NC-SI), or the like. As used herein, out-of-band access refers to operations performed apart from a BIOS/operating system execution environment on information handling system 100, that is apart from the execution of code by processors 102 and 104 and procedures that are implemented on the information handling system in response to the executed code.

BMC 190 operates to monitor and maintain system firmware, such as code stored in BIOS/EFI module 142, option ROMs for graphics adapter 130, disk controller 150, add-on resource 174, network interface 180, or other elements of information handling system 100, as needed or desired. In particular, BMC 190 includes a network interface 194 that can be connected to a remote management system to receive firmware updates, as needed or desired. Here, BMC 190 receives the firmware updates, stores the updates to a data storage device associated with the BMC, transfers the firmware updates to NV-RAM of the device or system that is the subject of the firmware update, thereby replacing the currently operating firmware associated with the device or system, and reboots information handling system, whereupon the device or system utilizes the updated firmware image.

BMC 190 utilizes various protocols and application programming interfaces (APIs) to direct and control the processes for monitoring and maintaining the system firmware. An example of a protocol or API for monitoring and maintaining the system firmware includes a graphical user interface (GUI) associated with BMC 190, an interface defined by the Distributed Management Taskforce (DMTF) (such as a Web Services Management (WSMan) interface, a Management Component Transport Protocol (MCTP) or, a Redfish® interface), various vendor-defined interfaces (such as a Dell EMC Remote Access Controller Administrator (RACADM) utility, a Dell EMC OpenManage Server Administrator (OMSS) utility, a Dell EMC OpenManage Storage Services (OMSS) utility, or a Dell EMC OpenManage Deployment Toolkit (DTK) suite), a BIOS setup utility such as invoked by an "F2" boot option, or another protocol or API, as needed or desired.

In a particular embodiment, BMC 190 is included on a main circuit board (such as a baseboard, a motherboard, or any combination thereof) of information handling system 100 or is integrated onto another element of the information handling system such as chipset 110, or another suitable element, as needed or desired. As such, BMC 190 can be part of an integrated circuit or a chipset within information handling system 100. An example of BMC 190 includes an iDRAC or the like. BMC 190 may operate on a separate power plane from other resources in information handling system 100. Thus BMC 190 can communicate with the management system via network interface 194 while the resources of information handling system 100 are powered off. Here, information can be sent from the management system to BMC 190 and the information can be stored in a RAM or NV-RAM associated with the BMC. Information stored in the RAM may be lost after the power-down of the power plane for BMC 190, while information stored in the NV-RAM may be saved through a power-down/power-up cycle of the power plane for the BMC.

Information handling system 100 can include additional components and additional busses, not shown for clarity. For example, information handling system 100 can include multiple processor cores, audio devices, and the like. While a particular arrangement of bus technologies and interconnections is illustrated for the purpose of example, one of skill will appreciate that the techniques disclosed herein are applicable to other system architectures. Information handling system 100 can include multiple CPUs and redundant bus controllers. One or more components can be integrated together. Information handling system 100 can include additional buses and bus protocols, for example, I2C and the like. Additional components of information handling system 100 can include one or more storage devices that can store machine-executable code, one or more communications ports for communicating with external devices, and various input and output (I/O) devices, such as a keyboard, a mouse, and a video display.

For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smartphone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as processor 102, a programmable logic array (PLA), an embedded device such as a System-on-a-Chip (SoC), or other control logic hardware. Information handling system 100 can also include one or more computer-readable media for storing machine-executable code, such as software or data.

Some information handling systems may utilize a management service for managing service devices. The management service may be based on a management standard such as the WSMan and Redfish standards. These standards are DMTF open standards that define a protocol for managing the server devices as well as other devices, applications, and web services. Typically, management services utilize a discovery mechanism via a system management BIOS (SMBIOS) table as defined in Section 8.1 of the Redfish Host Interface Specification version 1.0.0. SMBIOS table entries have static values that are compiled by BIOS at system boot. This means that any change to an attribute of the management service or the host interface such as in-band host interface after system boot would result in an operating system reading stale entries from the SMBIOS table until the next system boot. For example, if the change made is to an endpoint attribute of an interface associated with the management service, then the operating system would rely on the stale value to establish a connection to the management service via the interface which may fail to connect to the management service. In addition, the management service needs a reliable and consistent mechanism to publish it's supported and/or enabled means to authenticate a user or a program. Further, the management service needs to configure and/or manage attributes associated with such an authentication mechanism.

The present disclosure provides a dynamic, reliable, and consistent framework for the management service to advertise or publish service endpoints and various attributes such as service entry point attributes and authentication attributes. The present disclosure also includes a mechanism for the operating system to configure and manage the attributes and authentication mechanisms.

Figure 2:
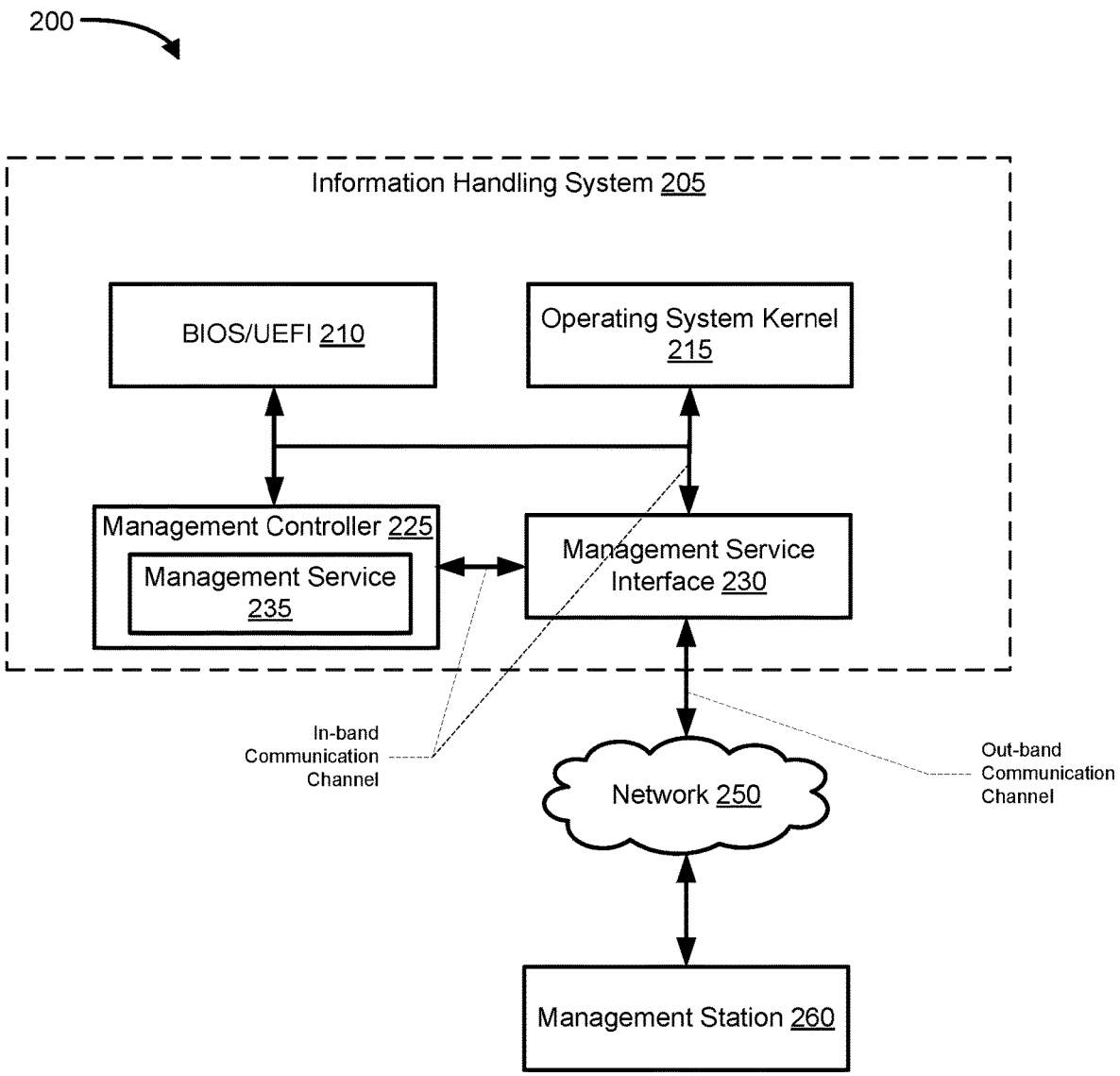
FIG. 2 is a block diagram illustrating an example of a system for publishing and configuring a management service interface, according to an embodiment of the present disclosure.

FIG. 2 illustrates a managed system 200 for publishing and configuring a management service interface. Managed system 200 provides a mechanism for a discovery and configuration framework for the management service interface. In addition, managed system 200 provides authentication and authorization mechanisms for a secure communication platform. Managed system 200 includes an information handling system 205, a network 250, and a management station 260. Information handling system 205, which is similar to information handling system 100 of FIG. 1, includes a BIOS/UEFI 210, an operating system kernel 215, a management controller 225, and a management service interface 230.

BIOS/UEFI 210 is similar to BIOS/EFI 142 of FIG. 1 while operating system kernel 215 represents a post-boot operating environment for information handling system 205. Operating system kernel 215 includes a standalone operating system environment, a virtualized operating system environment, a client-server environment, a terminal-host environment, another operating environment, or a combination thereof.

Management controller 225 is a separate processing unit, such as a system-on-a-chip (SoC), for managing various features of information handling system 205. Management controller 225 may comprise any system, device, or apparatus configured to facilitate management and/or control of components of the information handling system. For example, management controller 225 may comprise a microprocessor, microcontroller, a digital signal processor, an application-specific integrated circuit (ASIC), field-programmable gate array ("FPGA"), EEPROM, or any combination thereof.

In one embodiment, management controller 225 may be communicatively coupled to operating system kernel 215 such as via a network interface card. The network interface card may enable the service processor to communicate over the network using any suitable transmission protocol and/or standard to manage information handling system 205. Management controller 225 may manage information handling system 205 and its resources such as devices, applications, and web services through a management service using management service interface 230. Management controller 225 may be configured to calla function, issue a command and/or other signals to manage and/or control the aforementioned resources. For example, management controller 225 can monitor processor temperature, cooling fan speed, power status, operating system status, and the like.

In certain embodiments, management controller 225 may include or may be an integral part of a chassis management controller (CMC), a BMC, a Dell Remote Management controller (DRAC), an Integrated Dell Remote Management Controller (iDRAC), or an enclosure controller (EC), a service processor, or an embedded controller. In these and other embodiments, management controller 225 may also be referred to as an access controller or a life-cycle controller.

Management station 260 may include a management console for a user or administrator to access management service interface 230 via network 250. Network 250 may include a local area network (LAN), a wide area network (WAN), an Internet and/or other network or network combinations while remaining within the scope of the present disclosure. For example, management controller 225 may provide a user interface, permitting the user or administrator referred simply as the user to interact with management controller 225 and configure control and management of the resources of information handling system 205 via management controller 225. As another example, management controller 225 may implement Redfish or WSMan or another suitable management protocol permitting a user to remotely access management controller 225 to configure the information handling system and its resources.

Management service interface 230, also referred to as a host interface, may include interfaces, such as a Redfish host interface, a WSMan host interface or similar, that can be used by host software to access a management service which is used to manage information handling system 205 and its resources via one or more management controllers such as management controller 225. Host software includes software running on information handling system 205, including an operating system and its software components such as drivers or applications, as well as pre-boot software such as UEFI or BIOS drivers and applications. Host software may also include the management service.

The management service, also referred to as a host service or simply a service, includes various management services using various management standards such as Redfish service which uses the Redfish management standard. The management service may include a collection of functionalities that implements protocols, resources, and functions that deliver management service interface 230 defined by the management API specification and its associated behaviors for one or more information handling systems. A service entry point, such as a Redfish service entry point, maybe an interface through which a particular instance of the management service is accessed. The management service may have more than one service entry point.

The present disclosure introduces a device-specific method (DSM) Advanced Configuration and Power Interface (ACPI) objects that may be used as standards that allow information handling system 205 to publish, configure, and manage management service interface 230. Table 1 to table 2-4.3 provides an example of the proposed framework. During boot, the operating system on detecting the proposed ACPI objects would then choose to use one or more functions to identify, configure, and manage management service interface 230 such as a Redfish in-band interface. The operating system may be alerted to a change to an attribute of management service interface 230 via an ACPI event. For example, the user at management station 260 updates the internet protocol address of management service interface 230 after booting information handling system 205. Management controller 225 would transmit a notification to BIOS/UEFI 210 to send out the ACPI event.

Operating system kernel 215 on detecting the ACPI event will then determine the change associated with the ACPI event based on an ACPI identifier. For example, the change may be associated with an update to an attribute of the host interface. If the operating system determines that the ACPI is associated with an update to a host interface attribute, then the operating system calls one or more DSM functions to read the attributes of the host interface and take appropriate actions such as invoking DSM function to set a host interface attribute or to update operating system services, in particular to update a variable associated with the operating system or an operating system service to accommodate the change.

The DSM mechanism provides a more secure environment for platforms to communicate the in-band attributes with the operating system by utilizing an authentication and/or authorization mechanism. Operating system kernel 215 can use the present disclosure to manage the management service interface attributes without requiring a third-party extension. For example, the operating system may enable or disable management service interface 230 or select an authentication mechanism also referred herein as authentication type or authentication mode on the available configurable option controlled by management controller 225.

Table 1 below shows a control method that provides functions that may be consumed by the management service interface, also referred to as a host interface, as specified in section 9.1.1 of ACPI Specification Revision 6.3. To initiate a host interface transaction, the discovery of supported entry points is desirable. The method shown in table 1 below allows the host software to discover the supported service entry point. As shown, Arg0 is a buffer containing a universally unique identifier (UUID). The UUID also referred to as a globally unique identifier (GUID) may be a 128-bit long value. Arg1 is an integer that contains the function's revision identifier (ID). The revision ID is specific to the UUID. Arg2 is an integer containing a function index specific to the UUID and the revision ID. Function index values generally start at one with zero as a query function. Arg3 contains the parameters for the function specified by the UUID, revision ID, and function index.

TABLE 1

DSM Input Parameters

| Arguments | Value |
|---|---|
| Arg0 | A buffer including a UUID |
| Arg1 | An integer including a revision ID |
| Arg2 | An integer including a function index |
| Arg3 | A package that includes function-specific arguments |

Table 2 below shows different methods that can be used to discover the supported host interface functions. Specific functions are defined by the tables below. The functions can execute various program instructions such as to change, add, or delete a host service attribute. A function index represents a specific function whose meaning is specific to the UUID and a revision ID. Function index zero returns a buffer containing one bit for each function index, starting with zero as specified in section 9.1.1 of ACPI Specification Revision 6.3. Bit zero indicates whether there is support for any function other than function zero for the specified UUID and revision ID. If set to one, at least one additional function is supported. For the other bits in the buffer, a bit is set zero to indicate if that function index is not supported for the specific UUID and revision ID. If the function index is non-zero, the return is a data object associated with the UUID, revision ID, function index, and function arguments.

TABLE 2

Supported Functions

| Function Index | DSM Function Name |
|---|---|
| 0 | Query Function |
| 1 | Get Host Interface |
| 2 | Get Supported Authentication Types |
| 3 | Set Host Interface Attributes |
| 4 - 0xFFF | Reserved |

The tables 2-1 to 2-4.2 below show information associated with a generic format of each of the various supported functions identified in table 2. However, the structure of the various functions as shown in the tables below are shown for illustration purposes only and may change. Table 2-1 below shows the format of the output buffer for the function "Get Host Interface." In particular, table 2-1 may show the format of the output buffer for the function "Get Redfish Host Interface." The layout of the field "Structure definition for the host interface" is shown in table 2-1.1 below. The layout shown in table 2-1.1 is similar to the SMBIOS Management Controller Interface (Type 42) general layout.

Function Index 1—"Get Host Interface"
Input (Arg3): None
Return: This function returns host interface status and configuration capability in addition to the host interface structure similar to the SMBIOS Type 42 structure.

TABLE 2-1

Output Buffer for the function "Get Host Interface"

| Field | Description |
|---|---|
| Interface State | Enabled/Disabled |
| Operating System Configurable | Yes/No |
| Structure definition for the host interface | Interface specific data. See table 2-1.1 |

TABLE 2-1.1

Structure Definition for the Host Interface

| Offset | Name | Length | Value | Description |
|---|---|---|---|---|
| 00h | Type | BYTE | 42 | Management controller host interface structure indicator |
| 01h | Length | BYTE | Varies | Length of the structure, a minimum of 09h |
| 02h | Handle | WORD | Varies | |
| 04h | Interface Type | BYTE | Varies | Management controller interface type - network host interface = 40h |
| 05h | Interface Specific Data Length (n) | BYTE | Varies | Interface-specific data as specified by the interface type. If zero, there is no interface-specific data. |
| 06h | Interface Specific Data | n BYTEs | Varies | Defined by interface type See Table 2: Interface Specific Data for Interface Type 40h at Redfish Host Interface Specification version 1.0.0. |
| 06h + n | Protocol count | BYTE | Varies | Number of protocols defined for the host interface (typically 1) |
| 07h + n | Protocol Records | m BYTES | Varies | Include a protocol record for each protocol supported. See Table 4: Protocol Records Data format at Redfish Host Interface Specification version 1.0.0. |

Table 2-2 below shows the format of the output buffer for the function "Get Supported Authentication Types." In particular, the function may be specifically referred to as "Get Supported Redfish Authentication Types." The function does not require an Arg3 input and returns status and security information associated with the supported authentication type.

Function Index 2: Get supported Authentication Types
Input (Arg3): None
Return: This function returns the various authentication types and their corresponding attributes that a platform supports the in-band host interface.

TABLE 2-2

Output buffer for "Get Supported Authentication Types"

| Field | Description |
|---|---|
| Authentication Types | Bitmask of all the support host interface authentication mechanisms supported by the platform.<br>Bit [0] - Reserved<br>Bit [1] - Service token<br>Bit [2] - UEFI run time variable<br>Bit [3] - MCTP<br>Bit [4] - OAuth Authorization Framework<br>Bit [5] - Active Directory/Lightweight Directory Access Protocol (AD/LDAP)<br>Bit[6] - Original Equipment Manufacturer (OEM) Protocol<br>[Reserved fields] |
| Authentication Status | Bitmask of the current state of the supported Authentication mechanism.<br>0/1 - Indicates if a given Authentication type is currently enabled or disabled.<br>Bit [0] - Global Enabled/Disabled<br>Bit [1] - Service Token Enabled/Disabled<br>Bit [2] - UEFI run time variable Enabled/Disabled<br>Bit [3] - MCTP Enabled/Disabled<br>Bit[4] - OAuth Enabled/Disabled<br>Bit[5] - AD/LDAP<br>Bit [6] - OEM<br>[Reserved] |
| Length | Length of authentication specific data records |
| Authentication Records | 0xFF if not used. Data records specific to enabled authentication types. Table 2-4.1 |

Table 2-3 below shows the format of the input Arg3 for the function "Set Host Interface Attributes." In particular, the function may be "Set Redfish Host Interface Attributes." The function can be used to modify or update an attribute of a host interface.

Function Index 3: Set Host Interface Attributes. This function is used to set the attributes corresponding to the supported authentication types.
Input (arg3): See table 2-3 below.
Return: This function returns the various authentication types and their corresponding attributes that a platform supports the in-band host interface.

TABLE 2-3

Arg3 for the function "Set Host Interface Attributes"

| Field | Description |
|---|---|
| Interface State | Enabled/Disabled |
| Set authentication types | Bit [0] - Reserved<br>Bit [1] - Service Token<br>Bit [2] - UEFI run time variable<br>Bit [3] - MCTP<br>Bit [4] - OAuth authentication framework<br>Bit [5] - AD/LDAP<br>Bit [6] - OEM Protocol<br>[Reserved Fields] |
| Length | Length of Authentication specific data records |
| Authentication records | Configuration data are specific to a given authentication type Allows multiple authentication type specific records. |

TABLE 2-3-continued

Arg3 for the function "Set Host Interface Attributes"

| Field | Description |
|---|---|
| | However, if an authentication type is set and the corresponding authentication record is not passed, then the management controller may choose to use existing/default configuration values. See table 2-4. |

Table 2-4 below shows a structure for the configuration data specific for an authentication type. Table 2-4.1 shows an example of authentication specific data record for the service token authentication type. Table 2-4.1 shows an example of an authentication specific data record for the AD/LDAP authentication type.

TABLE 2-4

Configuration Data Structure

| Field | Description |
|---|---|
| Authentication Identifier | 0 - Description<br>1- Service Token<br>2- UEFI runtime variable<br>3- MCTP<br>4- OAuth authentication framework<br>5- AD/LDAP<br>6- OEM Protocol |

TABLE 2-4-continued

Configuration Data Structure

| Field | Description |
| --- | --- |
| Length Authentication Specific Data Record | Length of authentication specific data records Configuration data are specific to a given authentication type Allows multiple authentication type-specific records. See table 2-5. |

TABLE 2-4.1

Example Authentication Specific Data Record for Service Token

| Field | Description |
| --- | --- |
| Authentication Identifier | 1- Service Token |
| Service Token | Hashed Token |

TABLE 2-4.2

Example of Authentication Specific Data Record for AD/LDAP

| Field | Description |
| --- | --- |
| Authentication Identifier | 5 - AD/LDAP |
| AD_SSO_Enable | Enables or disables AD single sign-on authentication on the management controller |
| AD_DomainController | To obtain usernames, specify the LDAP server from which you want to connect to the management controller |
| Management_Controller_Name | Name of the management controller as recorded in the AD forest |
| . . . | Other AD fields |
| LDAP_Server | Configures the address of the LDAP server |
| LDAP_Port | Port of LDAP over the secure sockets layer (SSL). A non-SSL port is not supported. |
| LDAP_Bind_Password | A bind password is used with the bindDN. The bind password is sensitive data and must be protected. |
| . . . | Other LDAP fields |

Figure 3:
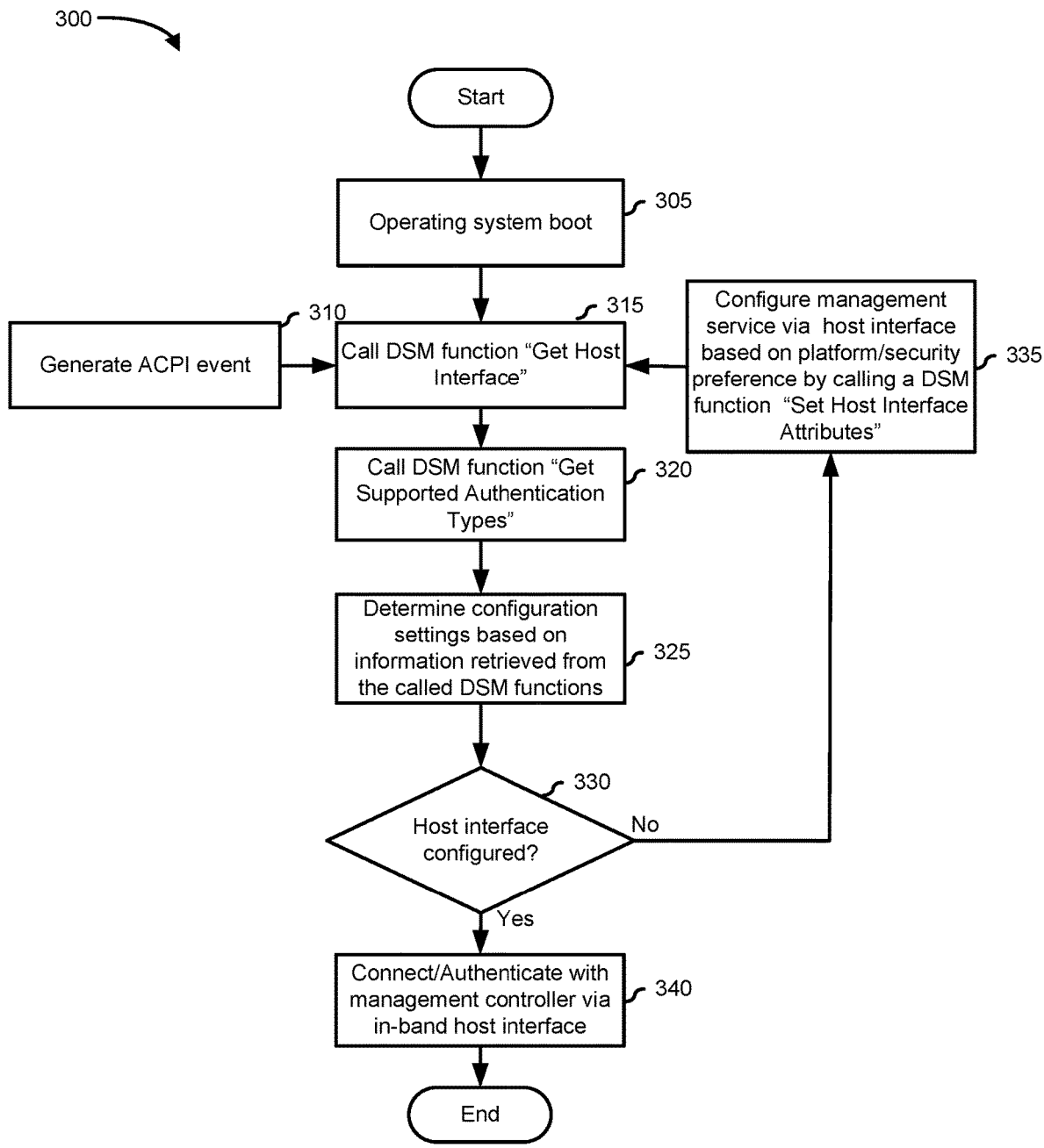
FIG. 3 is a flowchart illustrating an example of a method for publishing and configuring a management service interface, according to an embodiment of the present disclosure.

FIG. 3 illustrates a method 300 for publishing and configuring a management service interface. Method 300 provides a method for the platform and operating system to enable end to end in-band host management without the need for an agent. Method 300 may be performed by one or more components of FIG. 2. In particular, a block 305, a block 315, a block 320, a block 325, a decision block 330, block 335, and a block 340 may be performed by the operating system. Block 310 may be performed by the BIOS/UEFI.

At block 305, the information handling system is initialized or booted to an operating system such as Windows® or Linux™. The BIOS is a system firmware typically used for the initialization and launching of an ISA computer system. At the system boot, the information handling system may detect ACPI objects such as the DSM as proposed in the present disclosure. The DSM includes functions that allow the operating system to publish, configure, and manage the host interface. For example, the information handling system may detect the functions "Get Host Interface," "Get Supported Authentication Types," and "Set Host Interface Attributes." In addition, the operating system may detect if there is a change in an attribute such as EFI_REDFISH_INFORMATION_FW_CREDENTIALS or EFI_REDFISH_INFORMATION_OS_CREDENTIALS at system boot. The method proceeds to block 315.

At block 310, an ACPI event may be generated by the BIOS as directed by the management controller. The ACPI event may be used to alert the operating system on changes to host interface attributes dynamically on real-time. The ACPI event may be triggered when a change is made to the host interface such as an attribute. For example, the ACPI event may be generated when a configuration setting or an attribute such as an internet protocol address of a host interface is updated. For example, an administrator updates the internet protocol address via a management console through an out-band host interface. Prior to the present disclosure, updates to the configuration setting or attribute may be published in a SMBIOS table which is static and is not usually discovered by the operating system until the next reboot. This means that the operating system may rely on stale information until the next reboot. In the present disclosure, the platform sends an ACPI event dynamically to notify the operating system of the change in configuration setting or attribute at runtime. After the operating system receives or detects the ACPI event, the method proceeds to block 315.

At block 315, the ACPI event may trigger the method to call a DSM function, "Get Host Interface" to read the current configuration settings or attribute values. Using the information retrieved with the function call, the method may determine the configuration setting and/or attribute value that was changed. In this case, the method may call the function to determine the updated configuration setting that is the internet protocol address. As shown in block 305, the method to call the DSM function may also be triggered by the system boot.

The method proceeds to block 320 where the method may call a DSM function "Get Supported Authentication Types." The aforementioned function includes information regarding the supported authentication types such as status and data record to enable an authentication type. Using the information retrieved with the function call, the method may determine the configuration setting and/or attribute value associated with the authentication types that were changed. For example, the administrator may have changed the authentication type from AD/LDAP to service token using the out-of-band interface. The method may proceed to block 325.

At block 325, the method determines whether to retain or keep the update. The method may retain the update and be used by an application using the host interface. In particular, the method may determine whether the host interface has been successfully configured based on the update. The method may also determine whether to configure variables used by the operating system, operating system services, or other applications based on the update. The method may use one or more rules and/or algorithms to perform the determination. For example, the rules may include whether the service token authentication type is authorized or unauthorized to be used as the authentication type for the host interface. In another example, an error may have occurred during the update such that the host interface has not been configured successfully, such as a network error. The method may also determine one or more actions associated with the update such as to restart the management service. The action may include updating a second attribute of the management service or the host interface. In addition, the action may also include updating operating system services to accommodate the update. The method may proceed to decision block 330.

At decision block 330, the method may determine whether to retain or keep the update. In particular, the method may determine whether the host interface has been successfully configured. If the method determines that the host interface has been successfully configured and to retain/keep the update, then the "YES" branch is taken, and the method proceeds to decision block 340. If the method determines that the host interface has not been successfully configured and to not retain/keep the update, then the "NO" branch is taken and the method proceeds to block 335.

At block 335, the method may configure or update an attribute of the host interface based on the platform and/or security preference in association with the determination on block 325. For example, if the update is associated with changing the authentication type to one that that is not allowed by the operating system, then the method may update the authentication type to one that is allowed by the operating system. In another example, the method may change the value of the attribute to the value of the attribute prior to the latest update. The method may perform the update by calling the DSM function "Set Host Interface Attributes."

At block 340, the method may connect and/or authenticate with the management controller via the host interface, which may be an in-band host interface such as the Redfish host interface. The method may connect and/or authenticate with the management controller based on the data from block 315 and block 320. The data may include security information needed to connect or authenticate with the management controller. In addition, the method may configure the operating system, the operating service, and/or applications based on the update. The method may also perform other functions or actions associated with the update based on the determination at block 325. For example, if the internet protocol address of the host interface has changed, then the operating system may restart the management service associated with the host interface using the new internet protocol address. The method may also update connections of one or more applications with the current attribute. For example, the method may update the connections with the updated internet protocol address. The method ends.

While embodiments in FIG. 2 and FIG. 3 used the Redfish standard and the Restful architecture interface, the present disclosure may apply to any management protocol or services such as WSMan and Simple Object Access Protocol (SOAP). In addition, although FIG. 3 show example blocks of method 300 in some implementation, method 300 may include additional blocks, fewer blocks, different blocks, or differently arranged blocks than those depicted in FIG. 3. Additionally, or alternatively, two or more of the blocks of method 300 may be performed in parallel. For example, block 315 and block 320 may be performed in parallel.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionalities as described herein.

The present disclosure contemplates a computer-readable medium that includes instructions or receives and executes instructions responsive to a propagated signal; so that a device connected to a network can communicate voice, video or data over the network. Further, the instructions may be transmitted or received over the network via the network interface device.

While the computer-readable medium is shown to be a single medium, the term "computer-readable medium" includes a single medium or multiple medium, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or another storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents but also equivalent structures.

What is claimed is:

1. A method comprising:
   discovering, by a processor, a device specific method subsequent to one of a system boot or detecting an advanced configuration power interface (ACPI) event, wherein the ACPI event is triggered by an update to an attribute of a host interface, and wherein the discovering the device specific method includes:
      determining structure of the host interface associated with a management service;

determining a supported authentication type of the management service and security information associated with the supported authentication type; and determining value of the update to the attribute of the host interface; and subsequent to the discovering the device specific method:

authenticating to the management service based on the supported authentication type and the security information; and configuring an operating system variable based on the update of the attribute.

2. The method of claim 1, wherein the update to the attribute of the host interface is performed at a management console via an out-of-band host interface.

3. The method of claim 1, wherein the determining the supported authentication type includes determining a status of the supported authentication type.

4. The method of claim 1, wherein the host interface is an in-band interface.

5. The method of claim 1, further comprising updating an operating system service using a default configuration value.

6. The method of claim 1, wherein the update of the attribute is subsequent to the system boot.

7. The method of claim 1, wherein the detecting the ACPI event is subsequent to the system boot.

8. The method of claim 1, further comprising restarting the management service associated with the host interface is subsequent to the configuring the operating system variable.

9. An information handling system, comprising:

a management controller configured to direct a basic input/output system to generate an advanced configuration power interface (ACPI) event, wherein the ACPI event is triggered by an update of a host interface attribute; and a processor coupled to the management controller, the processor configured to:

publish a device specific method associated with a plurality of functions to publish a host interface and to configure the host interface, wherein the host interface is associated with a management service;

detect the ACPI event triggered by the update of the host interface attribute; and subsequent to the detection of the ACPI event, the processor is further configured to:

determine structure of the host interface associated with the management service;

determine a supported authentication type and security information associated with the supported authentication type;

authenticate to the host interface via the supported authentication type with the security information; and update an operating system variable associated with the update of the host interface attribute.

10. The information handling system of claim 9, wherein the management service is associated with the management controller.

11. The information handling system of claim 10, wherein the management service supports a plurality of authentication types.

12. The information handling system of claim 10, further comprising another management controller associated with the management service.

13. The information handling system of claim 9, wherein the host interface is an in-band interface.

14. A non-transitory computer-readable medium including code for performing a method, the method comprising:

discovering a device specific method subsequent to one of system boot or detecting an advanced configuration power interface (ACPI) event, wherein the ACPI event is triggered by an update to an attribute of a host interface, and wherein the discovering the device specific method includes:

determining structure of the host interface associated with a management service;

determining a supported authentication type of the management service and security information associated with the supported authentication type; and determining value of the update to the attribute of the host interface; and subsequent to the discovering the device specific method:

authenticating to the management service based on the supported authentication type and the security information; and configuring an operating system variable based on the update of the attribute.

15. The method of claim 14, wherein the determining the structure of the host interface is performed by calling using a function of the device specific method.

16. The method of claim 14, wherein the host interface is an in-band interface.

17. The method of claim 14, further comprising updating a second attribute of the host interface.

18. The method of claim 14, further comprising advertising host interface entry point attributes.

19. The method of claim 14, further comprising enabling the supported authentication type.

20. The method of claim 14, further comprising disabling the supported authentication type.

* * * * *